US009089898B2

(12) United States Patent
Li et al.

(10) Patent No.: US 9,089,898 B2
(45) Date of Patent: Jul. 28, 2015

(54) SCREWDRIVER INCLUDING A CONDUIT REAMER

(75) Inventors: Cheng Zhang Li, Colgate, WI (US); Michael S. Steele, Waukesha, WI (US); Wade F. Burch, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 377 days.

(21) Appl. No.: 13/600,501

(22) Filed: Aug. 31, 2012

(65) Prior Publication Data

US 2013/0055507 A1     Mar. 7, 2013

Related U.S. Application Data

(60) Provisional application No. 61/529,310, filed on Aug. 31, 2011.

(51) Int. Cl.
*B25B 15/00*     (2006.01)
*B23B 51/00*     (2006.01)
*B23B 5/16*     (2006.01)
*B23D 77/02*     (2006.01)
*B25B 15/02*     (2006.01)

(52) U.S. Cl.
CPC ............. *B23B 5/168* (2013.01); *B23B 5/167* (2013.01); *B23D 77/02* (2013.01); *B25B 15/00* (2013.01); *B25B 15/02* (2013.01)

(58) Field of Classification Search
CPC ......... B23B 5/168; B23B 5/167; B23D 77/02
USPC ...................... 7/157; 408/223–225
See application file for complete search history.

(56) References Cited

U.S. PATENT DOCUMENTS

| 527,246 | A | | 10/1894 | Marsh |
| 2,575,779 | A | | 11/1951 | Young |
| D170,119 | S | | 8/1953 | Hull |
| 2,761,335 | A | | 9/1956 | Bernardi |
| 2,765,013 | A | | 10/1956 | Pedersen |
| 2,875,651 | A | | 3/1959 | Kissinger et al. |
| 3,138,044 | A | | 6/1964 | Olexson |
| 3,769,510 | A | | 10/1973 | Kotera et al. |
| 4,274,770 | A | | 6/1981 | Singer |
| D333,964 | S | * | 3/1993 | Alexander ............ D8/82 |
| 5,427,477 | A | | 6/1995 | Weiss |

(Continued)

FOREIGN PATENT DOCUMENTS

WO     2007/002230     1/2007

OTHER PUBLICATIONS

Taiwan Intellectual Property Office Action for Application No. 101131615 dated Oct. 17, 2014 (13 pages).

*Primary Examiner* — Bryan R Muller
(74) *Attorney, Agent, or Firm* — Michael Best & Friedrich LLP

(57) ABSTRACT

A screwdriver includes a handle, a screwdriver head coupled to the handle, and a conduit reamer coupled to the handle. The conduit reamer includes a first cylindrical portion having a first sidewall with a first diameter, and a second cylindrical portion positioned partially within and extending out of the first cylindrical portion. The second cylindrical portion has a second sidewall with a second diameter. The second diameter is smaller than the first diameter such that a gap is formed between the first and second sidewalls. The conduit reamer also includes a blade having a reaming edge positioned in the gap between the first and second sidewalls.

18 Claims, 3 Drawing Sheets

(56) References Cited

U.S. PATENT DOCUMENTS

| | | | |
|---|---|---|---|
| 6,487,947 B1 * | 12/2002 | Clai | 82/113 |
| 6,524,035 B1 * | 2/2003 | Robison | 408/211 |
| 7,029,211 B2 * | 4/2006 | Oswald | 408/211 |
| 7,651,303 B2 * | 1/2010 | Zick et al. | 408/80 |
| 2011/0308021 A1 * | 12/2011 | Yang et al. | 7/157 |

* cited by examiner

US 9,089,898 B2

SCREWDRIVER INCLUDING A CONDUIT REAMER

CROSS-REFERENCE TO RELATED APPLICATIONS

This application claims priority to U.S. Provisional Patent Application No. 61/529,310, filed Aug. 31, 2011, the entire contents of which are incorporated by reference herein.

FIELD OF THE INVENTION

The present invention relates to hand tools and, more particularly, to screwdrivers including conduit reamers.

BACKGROUND

Conduits, such as pipes, are commonly cut with saw blades to various desired lengths. Saw blades, however, may leave burs or otherwise rough edges on ends of the conduits after cutting. Conduit reamers are typically used to ream or debur the ends of these conduits in order to clean and smooth the ends.

SUMMARY

In one embodiment, the invention provides a screwdriver including a handle, a screwdriver head coupled to the handle, and a conduit reamer coupled to the handle. The conduit reamer includes a first cylindrical portion having a first sidewall with a first diameter, and a second cylindrical portion positioned partially within and extending out of the first cylindrical portion. The second cylindrical portion has a second sidewall with a second diameter. The second diameter is smaller than the first diameter such that a gap is formed between the first and second sidewalls. The conduit reamer also includes a blade having a reaming edge positioned in the gap between the first and second sidewalls.

In another embodiment, the invention provides a handle, a tool bit including a screwdriver head, and a conduit reamer coupled to the handle. The conduit reamer includes a first cylindrical portion having a first sidewall with a first diameter, and a second cylindrical portion positioned partially within and extending out of the first cylindrical portion. The second cylindrical portion has a second sidewall with a second diameter. The second diameter is smaller than the first diameter such that a gap is formed between the first and second sidewalls. The conduit reamer also includes a third cylindrical portion positioned partially within and extending out of the second cylindrical portion. The third cylindrical portion has a third sidewall with a third diameter. The third diameter is smaller than the second diameter such that a gap is formed between the second and third sidewalls. The conduit reamer further includes a bit receiver positioned within the third sidewall. The bit receiver defines a bore that receives the tool bit. The conduit reamer also includes a blade having a first reaming edge positioned in the gap between the first and second sidewalls, and a second reaming edge positioned in the gap between the second and third sidewalls.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
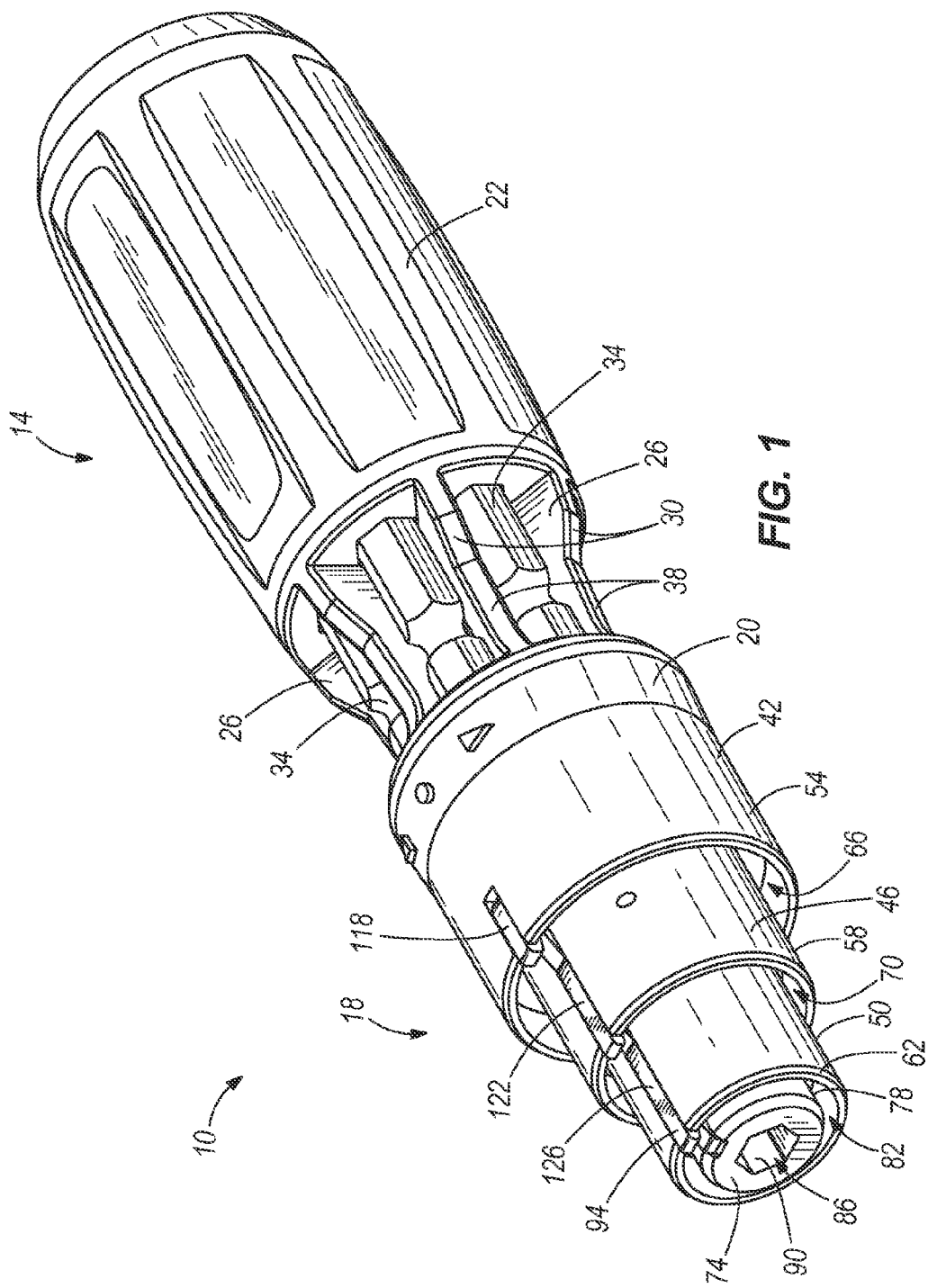
FIG. 1 is a perspective view of a screwdriver including a conduit reamer according to one embodiment of the invention.
Figure 2:
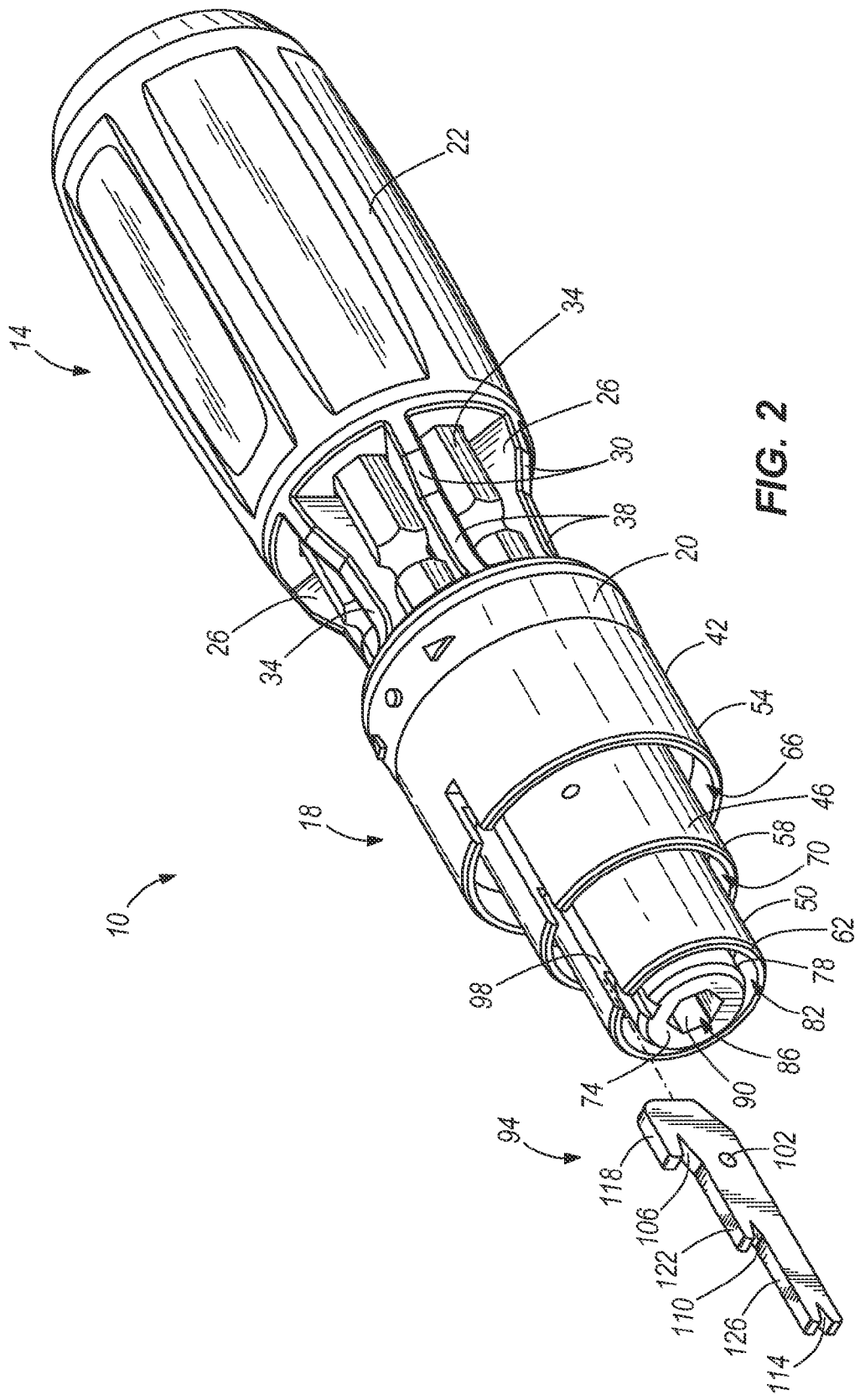
FIG. 2 is an exploded perspective view of the screwdriver and the conduit reamer shown in FIG. 1.

FIGS. 1 and 2 illustrate a screwdriver 10 according to one embodiment of the invention. The illustrated screwdriver 10 is a manually-operated hand tool that is operable to drive a screw, or other fastener, into a work piece. In the illustrated embodiment, the screwdriver 10 includes a handle 14 and a conduit reamer 18. In some embodiments, the handle 14 and the conduit reamer 18 may be two separate components that are permanently or releasably secured together. In other embodiments, the handle 14 and the conduit reamer 18 may be integrally formed as a single component. In the illustrated embodiment, the screwdriver 10 also includes a ratcheting mechanism 20 such that the screwdriver 10 is a ratcheting screwdriver. In other embodiments, the screwdriver 10 may be a non-ratcheting screwdriver.

The handle 14 includes an elongated grip 22 configured to be grasped by a user. In some embodiments, the grip 22 may be covered or coated with an elastomeric material to facilitate grasping and handling the screwdriver 10. In the illustrated embodiment, the handle 14 also includes a plurality of storage pockets 26. The pockets 26 are formed as recesses that are circumferentially spaced apart around the handle 14. The pockets 26 are separated from one another by sidewalls 30 and are configured to store screwdriver bits 34. Each bit 34 includes a screwdriver head, such as a flat head, a Phillips head, a torque head, or the like, that can engage and drive a corresponding threaded fastener. Each sidewall 30 includes a recessed surface 38 to facilitate accessing and removing the bits 34 from the pockets 26.

The conduit reamer 18 is coupled to and extends from the handle 14 such that the conduit reamer 18 is supported by the handle 14. In the illustrated embodiment, the conduit reamer 18 includes three cylindrical portions 42, 46, 50 of different diameters. In other embodiments, the conduit reamer 18 may include fewer or more cylindrical portions. The first cylindrical portion 42 has the largest diameter and extends from the handle 14. The second cylindrical portion 46 has a smaller diameter than the first cylindrical portion 42 such that the second cylindrical portion 46 is positioned partially within the first cylindrical portion 42 and extends between the first and third cylindrical portions 42, 50. The third cylindrical portion 50 has the smallest diameter such that the third cylindrical portion 50 is positioned partially within and extends out of the second cylindrical portion 46. The cylindrical portions 42, 46, 50 are arranged coaxially with each other and with the handle 14 such that the conduit reamer 18 has a stepped profile. Each cylindrical portion 42, 46, 50 includes a relatively thin sidewall 54, 58, 62. The sidewalls 54, 58, 62 are arranged concentrically such that a gap 66, 70 is formed between adjacent sidewalls 54, 58, 62.

The illustrated conduit reamer 18 also includes a bit receiver 74. The bit receiver 74 is coaxial with the cylindrical portions 42, 46, 50 and positioned within the sidewall 62 of the third cylindrical portion 50. An outer surface 78 of the bit receiver 74 is spaced apart from the sidewall 62 of the third cylindrical portion 50 to define a gap 82 therebetween. The bit receiver 74 defines a longitudinal bore 86 for receiving each of the screwdriver bits 34. In the illustrated embodiment, the bore 86 is defined by a hexagonal inner surface 90 configured to engage hexagonal shafts of the bits 34. In other embodiments, the bore 86 may be defined by inner surfaces having other shapes or configurations to receive different bit shafts. In some embodiments, a magnet may be positioned within or adjacent the bore 86 to facilitate coupling the screwdriver bits 34 to the receiver 74.

The conduit reamer 18 further includes a blade 94. The blade 94 is configured to ream or debur conduits (e.g., pipes, tubes, etc.) of various diameters. In the illustrated embodiment, the blade 94 is positioned within a slot 98 (FIG. 2). The slot 98 is formed in the outer surface 78 of the bit receiver 74 and extends through the sidewalls 54, 58, 62 of the cylindrical portions 42, 46, 50. The blade 94 is secured within the slot 98 by a set screw (not shown) that nests within a recess 102 (FIG. 2) formed in the blade 94. The slot 98 and the set screw allow the blade 94 to be removed from the screwdriver 10 and replaced with a fresh blade after becoming worn. In other embodiments, the blade 94 may be secured to the conduit reamer 18 using other suitable fastening means. In still other embodiments, the blade 94 may be integrally formed on the conduit reamer 18.

Figure 3:
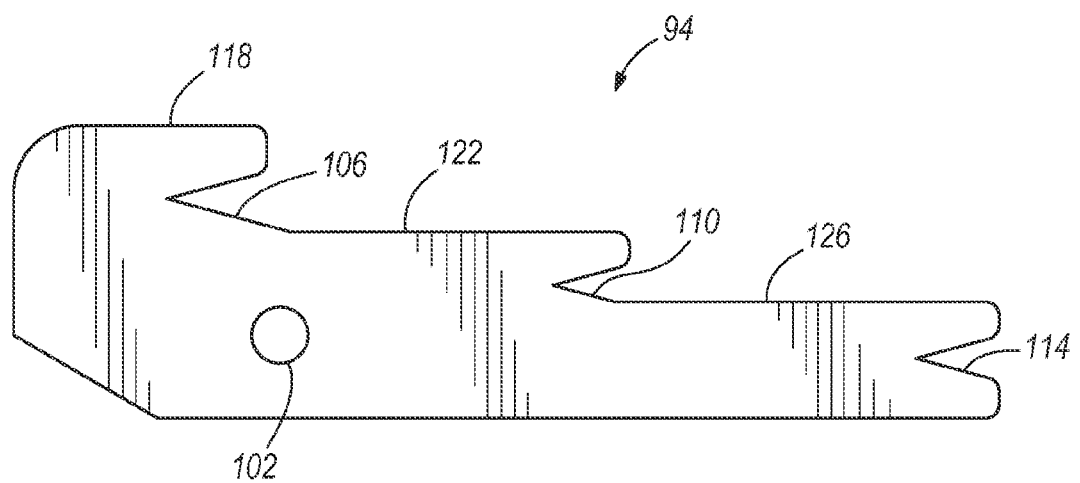
FIG. 3 is a side view of a blade of the conduit reamer shown in FIG. 1.

As shown in FIGS. 2 and 3, the illustrated blade 94 includes three reaming edges 106, 110, 114 and three planar edges 118, 122, 126. In other embodiments, the blade 94 may include fewer or more reaming edges, depending on the number of cylindrical portions extending from the handle 14. Each reaming edge 106, 110, 114 is generally V-shaped and positioned within one of the gaps 66, 70, 82 when the blade 94 is inserted into the slot 98 (as shown in FIG. 1). The first reaming edge 106 is positioned in the gap 66 between the first cylindrical portion 42 and the second cylindrical portion 46, the second reaming edge 110 is positioned in the gap 70 between the second cylindrical portion 46 and the third cylindrical portion 50, and the third reaming edge 114 is positioned in the gap 82 between the third cylindrical portion 50 and the bit receiver 74. The reaming edges 106, 110, 114 receive ends of conduits to ream and debur the conduits.

The planar edges 118, 122, 126 are positioned between the reaming edges 106, 110, 114. The first planar edge 118 extends from an end of the first reaming edge 106 toward a rear of the blade 94. The second planar edge 122 extends from another end of the first reaming edge 106 to an end of the second reaming edge 110. The third planar edge 126 extends from another end of the second reaming edge 110 to an end of the third reaming edge 114.

As shown in FIG. 1, the planar edges 118, 122, 126 are shaped and sized such that the blade 94 is flush with the sidewalls 54, 58, 62 when the blade 94 is inserted into the slot 98. That is, the first planar edge 118 generally aligns with the sidewall 54 of the first cylindrical portion 42, the second planar edge 122 generally aligns with the sidewall 58 of the second cylindrical portion 46, and the third planar edge 126 generally aligns with the sidewall 62 of the third cylindrical portion 50. Such an arrangement gives the cylindrical portions 42, 46, 50 of the conduit reamer 18 a smooth and continuous appearance when the blade 94 is coupled to the screwdriver 10.

In operation, the illustrated conduit reamer 18 is configured to ream conduits having three different diameters. For example, the first reaming edge 106 of the blade 94 can ream an electrical metal tube (EMT) having a 1 inch inside diameter, the second reaming edge 110 can ream an EMT having a ¾ inch inside diameter, and the third reaming edge 114 can ream an EMT having a ½ inch inside diameter. An end of a conduit is inserted into the appropriate gap 66, 70, 82 formed in the conduit reamer 18 until the end contacts the corresponding reaming edge 106, 110, 114. The gaps 66, 70, 82 provide clearance between the cylindrical portions 42, 46, 50 and the bit receiver 74 for portions of the conduit that are not in contact with one of the reaming edges 106, 110, 114. The screwdriver 10 is then rotated relative to the conduit to ream and debur the end of the conduit.

Although the invention has been described in detail with reference to certain preferred embodiments, variations and modifications exist within the scope and spirit of one or more independent aspects of the invention.

Various features and advantages of the invention are set forth in the following claims.

The invention claimed is:

1. A screwdriver comprising:
a handle;
a screwdriver head coupled to the handle; and
a conduit reamer coupled to the handle, the conduit reamer including
a first cylindrical portion having a first sidewall with a first diameter,
a second cylindrical portion positioned partially within and extending out of the first cylindrical portion, the second cylindrical portion having a second sidewall with a second diameter, the second sidewall extends out of the first cylindrical portion, the second diameter being smaller than the first diameter such that a gap is formed between the first and second sidewalls,
a blade having a reaming edge positioned in the gap between the first and second sidewalls; and
a slot extending through the first sidewall and the second sidewall, and wherein the blade is positioned within the slot.

2. The screwdriver of claim 1, wherein the blade includes a first planar edge extending from a first end of the reaming edge and a second planar edge extending from a second end of the reaming edge, and wherein the first planar edge is generally aligned with the first sidewall and the second planar edge is generally aligned with the second sidewall such that the blade is flush with the first and second sidewalls.

3. The screwdriver of claim 1, wherein the blade is removably secured within the slot.

4. The screwdriver of claim 1, wherein the reaming edge of the blade is generally V-shaped.

5. The screwdriver of claim 1, wherein the conduit reamer further includes a third cylindrical portion positioned partially within and extending out of the second cylindrical portion, wherein the third cylindrical portion has a third sidewall with a third diameter, and wherein the third diameter is smaller than the second diameter such that a gap is formed between the second and third sidewalls.

6. The screwdriver of claim 5, wherein the reaming edge of the blade is a first reaming edge, and wherein the blade has a second reaming edge positioned in the gap between the second and third sidewalls.

7. The screwdriver of claim 1, wherein the screwdriver head is formed on a tool bit that is removably coupled to the handle.

8. The screwdriver of claim 7, wherein the conduit reamer further includes a bit receiver, wherein the bit receiver is positioned within the second sidewall, and wherein the bit receiver defines a bore that receives the tool bit.

9. The screwdriver of claim 8, wherein an outer surface of the bit receiver is spaced from the second sidewall such that a gap is formed between the bit receiver and the second sidewall.

10. The screwdriver of claim 9, wherein the reaming edge of the blade is a first reaming edge, and wherein the blade has a second reaming edge positioned in the gap between the bit receiver and the second sidewall.

11. The screwdriver of claim 9, wherein the conduit reamer includes a slot formed in the outer surface of the bit receiver, and wherein a portion of the blade is positioned in the slot.

12. The screwdriver of claim 7, wherein the handle includes a plurality of storage pockets circumferentially spaced apart around the handle, and wherein each storage pocket is configured to receive a tool bit.

13. A screwdriver comprising:
a handle;
a tool bit including a screwdriver head; and
a conduit reamer coupled to the handle, the conduit reamer including
a first cylindrical portion having a first sidewall with a first diameter,
a second cylindrical portion positioned partially within and extending out of the first cylindrical portion, the second cylindrical portion having a second sidewall with a second diameter, the second sidewall extends out of the first cylindrical portion, the second diameter being smaller than the first diameter such that a gap is formed between the first and second sidewalls,
a third cylindrical portion positioned partially within and extending out of the second cylindrical portion, the third cylindrical portion having a third sidewall with a third diameter, the third sidewall extends out of the second cylindrical portion, the third diameter being smaller than the second diameter such that a gap is formed between the second and third sidewalls,
a bit receiver positioned within the third sidewall, the bit receiver defining a bore that receives the tool bit,
a blade having a first reaming edge positioned in the gap between the first and second sidewalls, and a second reaming edge positioned in the gap between the second and third sidewalls; and
a slot extending through the first sidewall, the second sidewall, and the third sidewall, and wherein the blade is positioned within the slot.

14. The screwdriver of claim 13, wherein the slot is also formed in an outer surface of the bit receiver.

15. The screwdriver of claim 13, wherein the blade includes a first planar edge extending from a first end of the first reaming edge, a second planar edge extending between a second end of the first reaming edge and a first end of the second reaming edge, and a third reaming edge extending from a second end of the second reaming edge, and wherein the first planar edge is generally aligned with the first sidewall, the second planar edge is generally aligned with the second sidewall, and the third planar edge is generally aligned with the third sidewall such that the blade is flush with the first, second, and third sidewalls.

16. The screwdriver of claim 13, wherein the blade is removably secured within the slot.

17. The screwdriver of claim 13, wherein the first reaming edge and the second reaming edge are generally V-shaped.

18. The screwdriver of claim 13, wherein an outer surface of the bit receiver is spaced from the third sidewall such that a gap is formed between the bit receiver and the third sidewall, and wherein the blade has a third reaming edge positioned in the gap between the bit receiver and the third sidewall.

* * * * *